(12) United States Patent　(10) Patent No.: US 8,535,130 B2
Ciarrocchi　(45) Date of Patent: Sep. 17, 2013

(54) AMUSEMENT POD ENTERTAINMENT CENTER

(76) Inventor: Peter Ciarrocchi, Bensalem, PA (US)

( * ) Notice: Subject to any disclaimer, the term of this patent is extended or adjusted under 35 U.S.C. 154(b) by 0 days.

(21) Appl. No.: 12/860,416

(22) Filed: Aug. 20, 2010

(65) Prior Publication Data

US 2011/0111846 A1　May 12, 2011

Related U.S. Application Data

(63) Continuation-in-part of application No. 12/372,194, filed on Feb. 17, 2009, now Pat. No. 8,133,103.

(60) Provisional application No. 61/031,856, filed on Feb. 27, 2008, provisional application No. 61/028,684, filed on Feb. 14, 2008.

(51) Int. Cl.
　*A63F 13/00*　(2006.01)
(52) U.S. Cl.
　USPC .......................................................... 463/1
(58) Field of Classification Search
　USPC .... 463/1, 40, 42, 47; 273/148 B; 472/92–94
　See application file for complete search history.

(56) References Cited

U.S. PATENT DOCUMENTS

| | | | |
|---|---|---|---|
| 4,477,069 | A | 10/1984 | Crudgington, Jr. |
| 4,695,903 | A | 9/1987 | Serap et al. |
| 7,614,958 | B2 | 11/2009 | Weston et al. |
| 8,133,103 | B2 | 3/2012 | Ciarrocchi |
| 2004/0077423 | A1 | 4/2004 | Weston et al. |
| 2009/0209308 | A1 | 8/2009 | Ciarrocchi |
| 2010/0056285 | A1 | 3/2010 | Weston et al. |

OTHER PUBLICATIONS http://en.wikipedia.org/wiki/Xbox_Live, retrieved on Feb. 17, 2009..
http://en.wikipedia.org/wiki/Xbox_Live, retrieved on Feb. 17, 2009.
Zuccarelli, Dan. "I can use the warp zone to find my bed!," Jun. 26, 2006 (online), (retrieved on Sep. 30, 2010 from <URL: http://www.thebbps.com/articles/content/super-mario-room.html>.

*Primary Examiner* — Raleigh W Chiu
(74) *Attorney, Agent, or Firm* — Volpe and Koenig, P.C.

(57) ABSTRACT

A method of providing entertainment including providing a game cell bounded by walls comprising, a first video game console system, a screen that interacts with the video game console system and displays images generated by the video game console system, wherein an inside face of at least one wall is decorated with a theme that corresponds to a game playable on the video game console system, checking for the availability of the cell for use by a player, upon availability of the cell, accepting payment from the player for rental of the cell for a period of time, and providing at least one controller to the player for use in the cell, the controller interacting with the video game console system.

8 Claims, 11 Drawing Sheets

AMUSEMENT POD ENTERTAINMENT CENTER

CROSS REFERENCE TO RELATED APPLICATIONS

This application is a continuation-in-part of U.S. patent application Ser. No. 12/372,194, filed Feb. 17, 2009, now U.S. Pat. No. 8,133,103 which claims the benefit of U.S. provisional applications 61/028,684 and 61/031,856 filed Feb. 14 and 27, 2008 respectively, which are incorporated by reference as if fully set forth.

BACKGROUND

While bars and restaurants are and will likely remain popular entertainment destinations, customers and potential customers continually seek new experiences and entertainment options. It is of course well-known that bars and restaurants, or combinations thereof, are fun places for people to, inter alia, eat, drink, listen to music, and socialize. However, people are always looking for new and interesting experiences, and it is important for bar/restaurant owners to provide a unique or novel experience to attract customers, and to promote customer traffic. This, it is critical that a bar/restaurant update and "retool" the services or "extras" offered by the bar/restaurant. In the past, bars/restaurants included darts, pinball, and other games, to augment the social experience.

In recent years, video game systems such as the Nintendo Wii™, the Sony Playstation® and the Microsoft Xbox® have introduced video game experiences where players can play together and participate in video games having a shared experience. Thus, such video games as EA SPORTS Madden NFL Football™ and a host of sports games, HALO®, Rock Band™, and Guitar Hero™, to name a few, have become very popular due to the ability of players to participate in multi-layer, group, or simultaneous modes.

SUMMARY OF THE INVENTION

A method of providing entertainment including providing a game cell bounded by walls comprising, a first video game console system, a screen that interacts with the video game console system and displays images generated by the video game console system, wherein an inside face of at least one wall is decorated with a theme that corresponds to a game playable on the video game console system, checking for the availability of the cell for use by a player, upon availability of the cell, accepting payment from the player for rental of the cell for a period of time, and providing at least one controller to the player for use in the cell, the controller interacting with the video game console system.

DETAILED DESCRIPTION OF THE PREFERRED EMBODIMENTS

Figure 1:
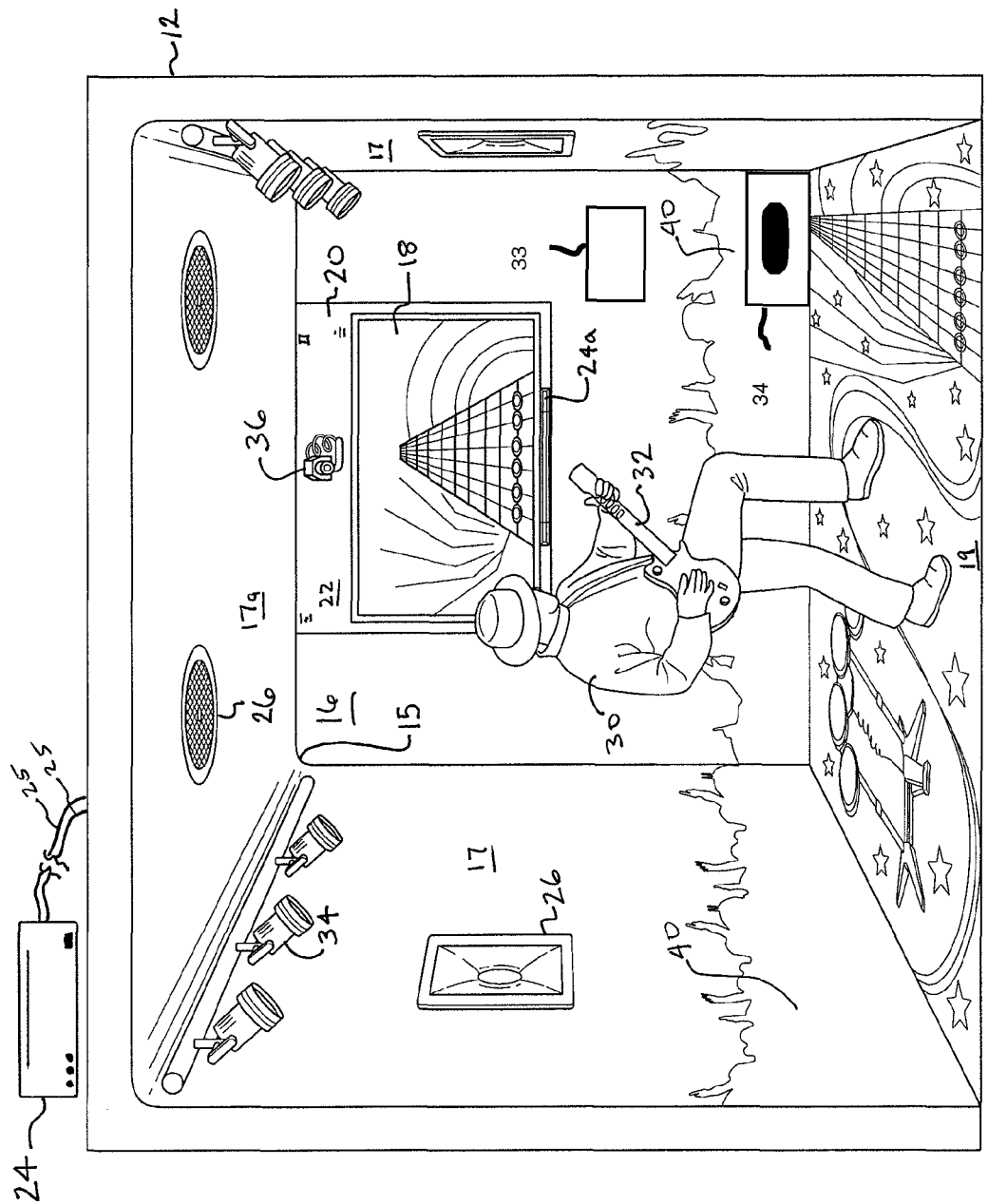
FIG. 1 shows a perspective view of a single cell in use.

As used herein, the term "game cell" is a room, area, space, pod, or enclosure capable of housing a projection screen (e.g., a video screen, a television, screen, or monitor anything that shows an image) with space for at least one person to participate in a game.

As shown in FIGS. 1-5, an amusement center 10 (for example, a restaurant, bar, recreation center, store, or even a residence) includes at least one game cell 12. The game cell 12 as shown is approximately cube-shaped and comprises three walls, a ceiling, and an open side 14. In use, one or more of the cell 12's walls might be substituted with an existing surface such as an existing wall, floor, or ceiling.

As shown, one of the walls is a projection wall 16. The projection wall 16 shows the interactive game itself on a screen 18. The screen 18 could project from the wall 16, be projected onto the wall 16, or as shown, be a screen 18 that is flush with the wall 16. Having the screen 18 be flush with the wall 16 adds to the ambiance (to be discussed) and the cell 12 accomplishes with a recessed cavity 20 in the wall 16. Access to the cavity could be through an outside face 16*a* of the wall 16 or through a clear window 22. To avoid damage and fingerprints, the clear window 22 that could be made from a shatter-resistant material would cover the screen 18 and cavity 20. To protect the screen 18 from damage, the screen 18 could be secured to the wall 16 or cavity 20 in such a way as to prevent easy access to the screen 18. In one embodiment, screen 18 may be a touchscreen which can detect the location and presence of a touch on the screen 18. The screen 18 may be a standard touchscreen, a touchscreen employing a multi-touch capability, a "touchless touchscreen" that uses optical cameras and magnetic strips to detect when a user is approaching the screen 18.

The cavity 20 may also provide space for components of a video game console system and/or CPU 24. The system 24 might also be stored outside the recessed cavity 20, or even remote to the game cell 12, as long as it delivers images to the screen 18 and can interact with a person 30 in the cell 12.

As shown, the game cell 12 has speakers 26 recessed into its sidewalls 17. In another embodiment, the speakers may be placed below the screen 18. The speakers may deliver sounds generated by the CPU 24. Alternatively, the speakers 26 may be connected to a central audio control center. The audio control center could switch audio to any selected audio source. For example, the speakers could be controlled to deliver sounds from another cell 12, from a television, an iPod®, or any audio source. Optionally, the speakers may be controlled by a wireless remote unit. Although four speakers 26 are shown, the speakers 26 could be associated with the screen 18, stored in the recessed cavity 20, or elsewhere inside the game cell 12. Moreover, more or less than four speakers 26, in particular enough to provide a surround-sound experience, could be included.

Each cell 12, in use when a player 30 (or players) is playing a game, also has at least one controller 32 within it. The controller 32 is one of the varied "joystick" type controllers that are available for the gaming systems, and may be shaped as shown in FIG. 1 as a guitar, or any other shape that is appropriate. For example and without limitation, the controller 32 could be shaped as a steering wheel, sword, gun, baseball bat, football, etc. For the Nintendo Wii® and systems that are sure to follow its lead in the future, motion of the controller 32 through space controls the action within the game through sensors 24*a* mounted within the cell 12. (The Wii® uses a sensor bar mounted below the screen 18.) Controllers 32 should be safely attached to players' wrists or arms, such as by a wrist-band, lanyard, or other means. The means of attaching the controller 32 to a players' body should be comfortable, but not easily removed. Alternatively, each cell 12 may have a hands-free controller setup, wherein the game system is controller is a combination of a camera, depth sensor and multi-array microphone to provide full-body 3D motion capture, facial recognition, and voice recognition capabilities. This may be used, for example, with an Xbox Kinect game system. The microphone array may allow the game system to perform acoustic source localization and ambient noise suppression, allowing for things such as headset-free party chat over a game system. Optionally, each cell 12 may include a controller port, wherein a user can provide their own controllers.

The cell 12 could be lit with lights 34, which could be plain white lights or colored lights, depending on the desired cell 12 conditions. Moreover, depending on the desired conditions, the lights 34 may not be activated or even present, and the cell 12 might be lit by ambient light. The lights 34 may also pulse, move, or rotate colors during gameplay to enhance the experience. Multiple lights 34, of uniform or different colors complementary to the cell's theme (discussion to follow), could be provided on light stanchions mounted inside the cell 12 as shown. Alternatively, the lights could be mounted inside the sidewalls 17 or ceiling 17a. Moreover, if appropriate, the cells 12 may not be lit with more than ambient light and the light from the screen 18. The lights 34 may be connected to a control device that responds to sound or movement. In one embodiment, the lights 34 may be configured to flash, change color, or move based on sounds or movements within the cell 12. The lights 34 may be controlled centrally, by a central control unit. Additionally, the lights may be controlled by a wireless control unit that controls the lights 34 directly, or through the central control unit.

The cell 12 may also have a single or multiple still or video cameras 36 mounted therein. The cameras 36 may feed a video monitor remote from the cell 12 that allows other people to watch the action inside the cell 12 or the cameras 36 may feed a recording device (not shown) that would allow a person 30 to purchase a souvenir movie of his game. The cameras 36 would also allow responsible parties to monitor the cell 12 and provide technical support or respond to inappropriate behavior. In addition, the cameras 36 may be used to capture player performances such as by recording the player performance on a DVD or another distributable media format of any kind, or taking a picture, within a game cell for the player to save for posterity. Additionally, cameras 36 could be used to create a picture-in-picture overlay wherein footage of players playing the game overlays game footage. Thus, a player could take home a souvenir of a "record setting" or "tournament winning" performance captured on DVD or a digital or tape format, and re-watch it, share it with friends and family, or upload to an internet video service and share with the world. An establishment could charge a fee for recording a player's game cell performance, or for the sale of the DVD or other format, or for any combination of those.

Each cell 12, may include a control unit 33. The control unit 33 may be a touchscreen device located on the projection wall 16, or the sidewall 17. The control unit 33 may be used for switching between gaming systems, adjusting the lighting, volume, and audio source. The control unit 33 may further be configured with a paging function, wherein the control unit 33 activates a link to the control center allowing the user to request additional time, beverages, or technical support. Additionally, the control unit 33 may be configured for checking in, requesting time for a cell 12, ordering food and drinks, and other services via an automated control system. To further automate the system, the control unit 33 may be connected to a payment receipt machine that accepts credit/debit cards, tokens, or prepaid cards designed for the ordering device. This may enhance the experience allowing users to order additional time and refreshments without leaving the cell 12. In one embodiment, the control unit 33 may be configured with a pass-code allowing limited access to customer users without the pass-code.

Each cell 12 can have its aesthetics compliment the game played on the screen 18, called a theme. As used herein the term "theme" refers generally to an overall aesthetic (graphics/décor/theme/sound/ornamentation) decorating or otherwise associated with a game cell that relates to the subject matter of a particular video game.

As used herein, a "themed cell" or a cell having a "theme" is a cell having pre-formed details that create a particular motif or aesthetic. A themed cell has a collection of pre-formed aesthetic, visual, graphic, video and/or audio details creating a unitary motif providing an immersive environment for player using or in the cell. The cell theme should preferably match, compliment and/or accentuate the theme of the game being played in the game cell. For example, a cell having a sports game should have a sports theme as reflected by the color (e.g., green for a football video game), the graphics (e.g., a football stadium and cheering fans and/or cheerleaders painted or otherwise projected on the walls of the cell for a football video game), the audio provided in a cell in addition to any audio of a game (e.g., the sounds of a cheering or booing rowdy crowd at a football game for a football video game), and a physical design relating to the game (e.g., Astroturf™ or a faux grass rug on the floor of a cell for a football video game). An immersive gaming experience is one where the player/gamer, even though in a bar or restaurant, feels immersed in the subject matter of a video game for a complete gaming experience.

In the example shown in FIG. 1, for example, the player 30 is playing a game like ROCK BAND® or GUITAR HERO® and the game cell 12's theme is shown in its walls 16 and 17 that are decorated to give the appearance of fans at a live concert. Of course, the ceiling and floor could also be appropriately decorated. This adds to the enjoyment of the game and also makes the cell 12 more interesting to those watching outside of it. As shown in FIG. 1, there is a fog machine 35. The fog machine emits a dense vapor that appears similar to fog or smoke. The fog may be created by vaporizing water and glycol or glycerine-based fluids or through the atomization of mineral oil.

Figure 3:
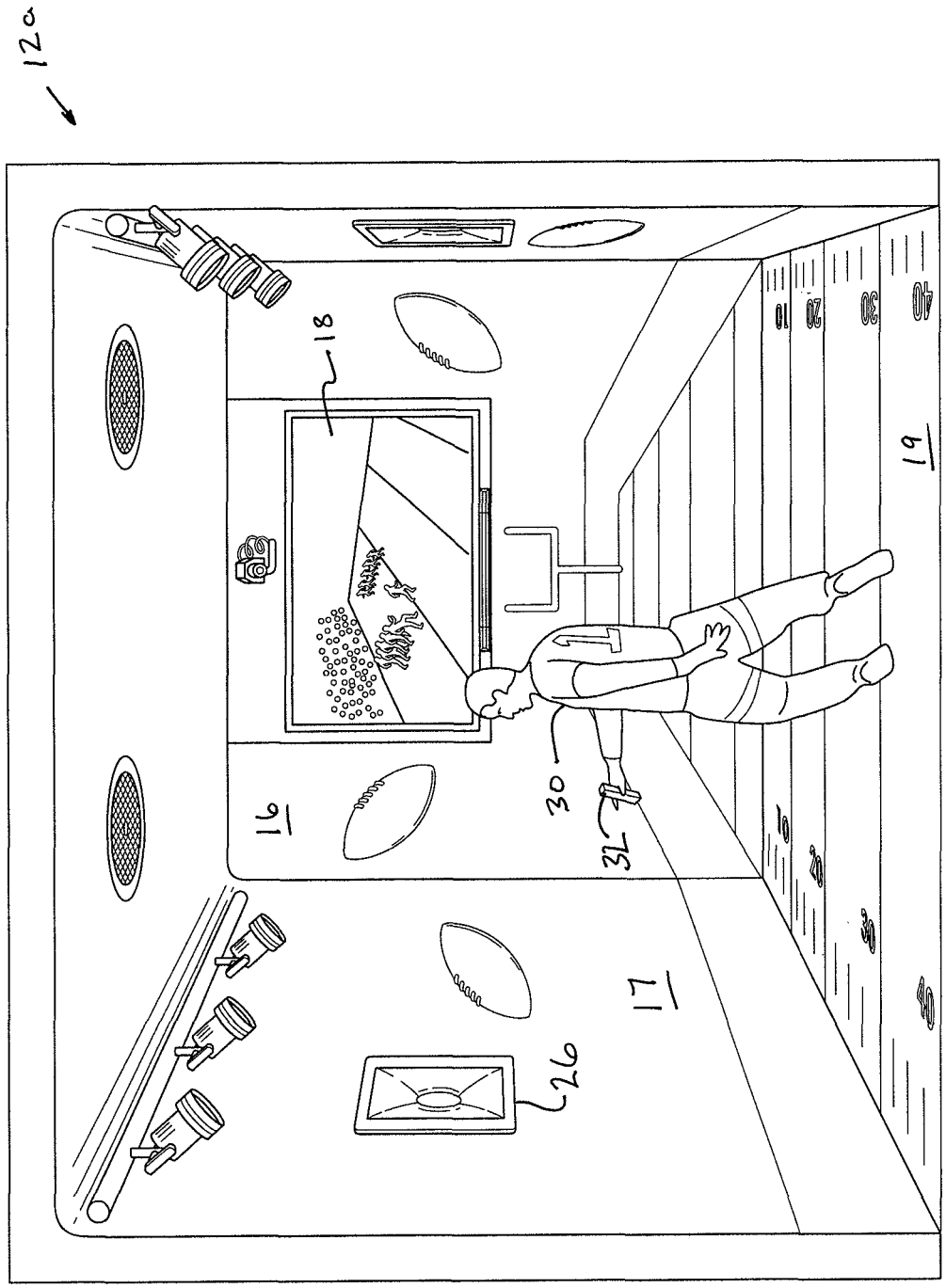
FIGS. 3-5 show cells with different themes.
Figure 4:
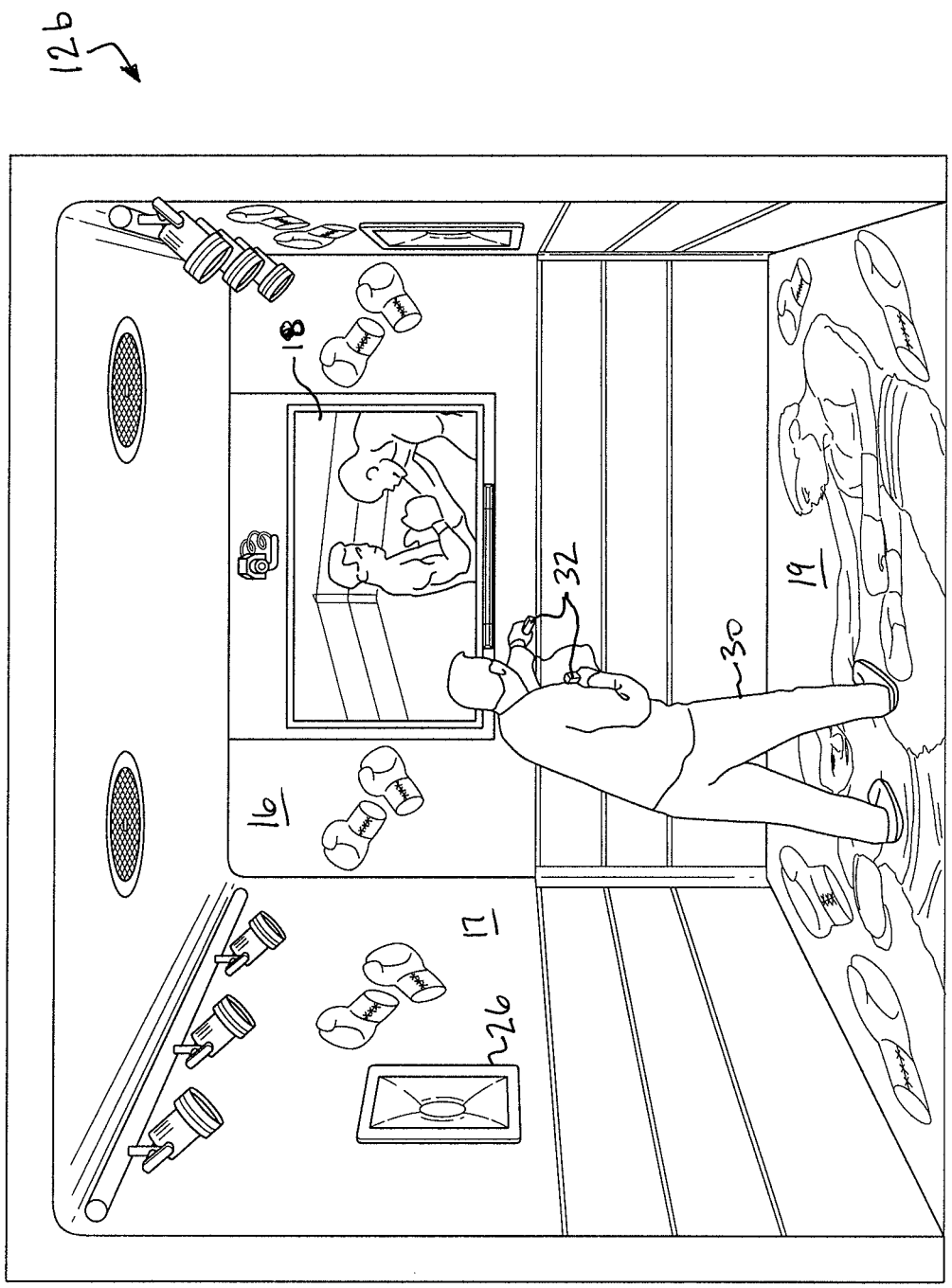
Figure 5:
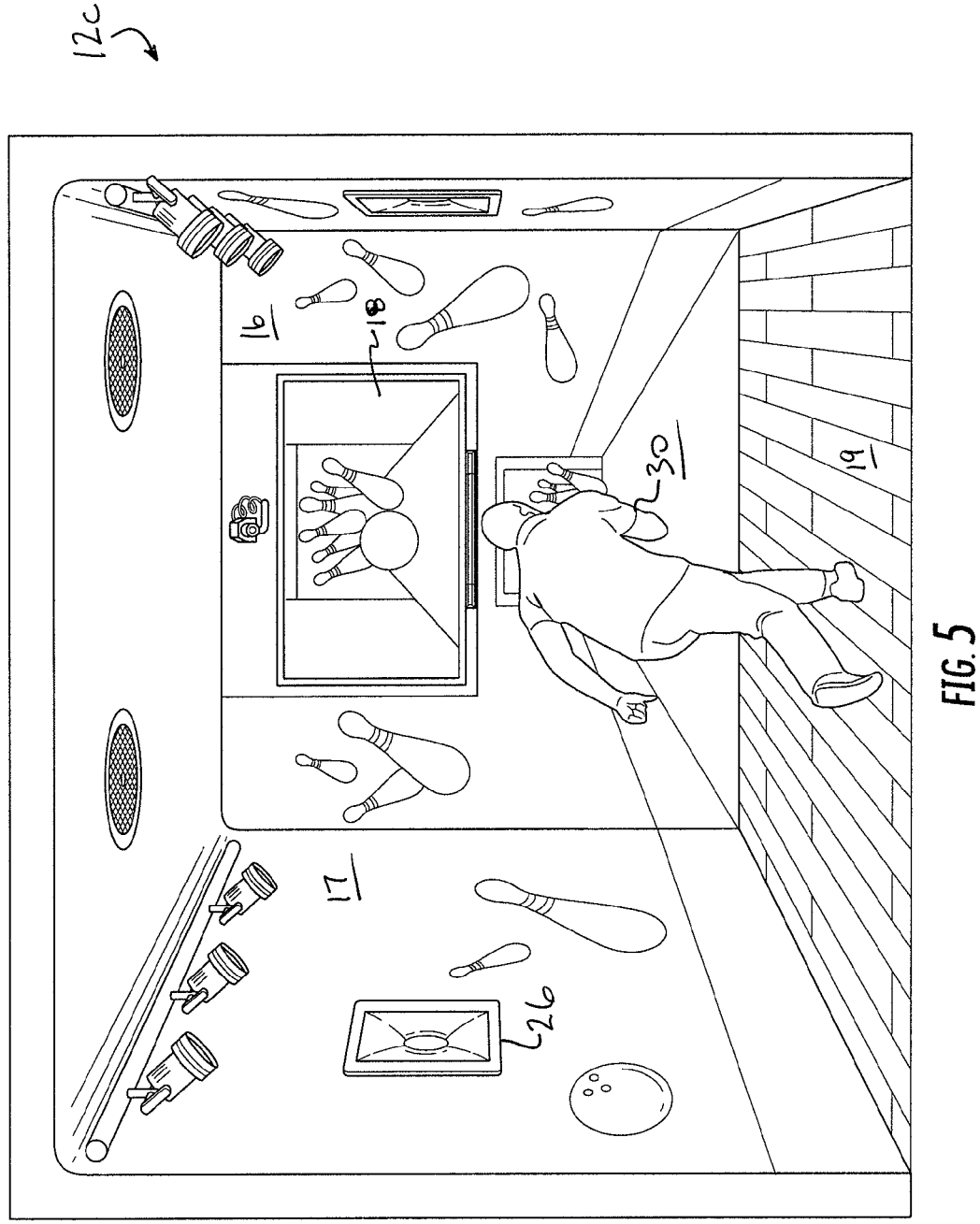

FIGS. 3-5 show different themed cells 12 including a football theme (FIG. 3), a boxing theme (FIG. 4, and a bowling theme (FIG. 5).

FIG. 3 shows a football game cell 12a to be used for playing, for example, a football video game. The football game cell 12a is therefore themed with a football theme, including, for example artificial turf on the floor 19 or a carpet resembling artificial turf of a football stadium, with yard lines marked on the "field," football fans painted or displayed on the walls 17, a football scoreboard, animated cheerleaders, or any other elements related to the theme of "football."

FIG. 4 shows a boxing game cell 12b with a player playing with, for example, a Wii™ boxing video game. Two players may stage a boxing match against each other. The game cell 12b is themed as a boxing ring, and may include piped-in crowd noises associated with boxing.

FIG. 5 shows a bowling game cell 12c with a player using a Wii™ video game console system, playing a bowling game. The floor 19 may be fashioned to resemble the wood floor of a bowling alley to compliment similarly-themed walls 17. Each of the above themed cells may have proper ambient themes piped in (crowd noise, other bowling alley sounds, etc.).

Another game cell may feature a player playing a baseball game, such as EA Sports: MVP Baseball™. Such a game cell would therefore be themed in a baseball theme, with a baseball field decor. It may also be outfitted with, for example, a real hotdog or popcorn or peanut concession or stand and other refreshments related to a baseball park experience.

Yet another game cell could include a "shooter" or "shooting" game such as HALO® or QUAKE®, and could include a science fiction or "post-apocalyptic wasteland" theme. Yet another game cell could include a "horror" theme for a "horror" video game such as Silent Hill™. A horror theme could include frightening or dark images (demons, etc.), a haunted house motif, or other scary elements.

The cell's 12 themes should compliment, accentuate and/or otherwise emphasize the game offered in the cell 12 for an optimum and immersive gaming experience. The decorations could be painted on the walls 16, 17 but a reusable, cleanable, and less-expensive option involves printing the decoration to a uniform size on a material that can be applied to the cell 12's walls 16, 17. Such a material could be a vinyl or similarly-washable patterned wallpaper 40. This allows for replacing the decorative paper 40 when it gets damaged or if the theme needs to be changed. Alternatively, the wall 16, 17's decorations could be projected onto the walls from projectors (not shown) mounted within the cell 12 or the walls 16, 17 themselves could be screens that allow for atmospheric projection thereon, it being understood that these types of projection would allow for the theme to both move and change depending on the game being played in the cell 12.

Table 1 below summarizes game and cell theme elements follows. Some or all of the elements might be present in any given cell 12.

TABLE 1

| Subject Matter of Video Game | Possible Themed elements |
| --- | --- |
| Baseball | Ambient baseball noises (e.g., "Charge!") |
| | Baseball equipment |
| | Baseball lined field |
| | Baseball memorabilia |
| | Baseball Scoreboard |
| | Baseball stadium |
| | Concessions |
| | Fans |
| | Mascot |
| | Team colors (such as local team where situated) |
| | Umpires |
| Competition singing or karaoke (e.g., AMERICAN IDOL ®) | Audience |
| | Band |
| | Judges |
| | Music graphics |
| First person shooter (e.g., HALO ®, QUAKE ®) | Ambient battle noises (e.g. firing weapons, bombs, planes, etc.) |
| | Enemies/monsters/aliens |
| | Environmental graphics (e.g., desert, wasteland, jungle, alien planet) |
| | Weapons |
| Football | Ambient football noises (e.g., "DEFENSE!") |
| | Cheerleaders |
| | Concessions |
| | Fans |
| | Football equipment |
| | Football lined field |
| | Football memorabilia |
| | Football Scoreboard |
| | Football stadium |
| | Referee |
| | Team colors (such as local team where situated) |
| Hockey | Ambient hockey noises (e.g., "KILL HIM!") |
| | Fans |
| | Hockey arena |
| | Hockey equipment |
| | Hockey memorabilia |
| | Hockey Scoreboard |
| | Ice |
| | Referee |
| | Team colors (such as local team where situated) |
| | Zamboni |
| Horror (e.g., Silent Hill ™) | Ambient "monster" noises (e.g., creaking boards, spooky ghost sounds, screams, etc.) |
| | Cobwebs |
| | Ghosts/goblins/demons |
| | Haunted house |
| | Occult graphics |
| Music (e.g., ROCK BAND ® or GUITAR HERO ®) | Ambient concert noises (e.g., cheering, whistling, etc.) |
| | Band |
| | Concert posters |
| | Crowd |
| | Instruments |
| | Music notes |
| | Wild changing colors |
| Role-player game (RPG, e.g., WORLD OF WARCRAFT ®) | Ambient battle sounds |
| | Medieval armies |
| | Medieval graphics (e.g., castles, swords, etc.) |
| | Medieval weapons |
| | Mythical creatures (e.g., dragons, hydras, monsters, tec.) |
| Water based sports (e.g., surfing, jet skiing, etc.) | Beach |
| | Beach goers |
| | Blue |
| | Ocean graphics |
| | Sea creatures |
| | Waves |
| Winter Sports (e.g., skiing, snow boarding, etc.) | Abominable snowman |
| | Ambient skiing sounds (e.g., "Whoosh" of skiers) |
| | Faux snow |
| | Olympic ™ sports graphics or competitors |
| | Ski lift |
| | Skiers |
| | Snowman |
| | Snowy mountain |
| | White floor or carpet |

Cell Construction

A cell 12 could be constructed of virtually any size or shape. With that in mind, a cell 12 with approximate interior dimensions of about 7 feet (width)×7 feet (height)×6.5 feet (depth). These dimensions provide adequate space for between 1-3 players within the cell 12 at a time, it being understood that some games (ROCK BAND®) require less room than others (e.g. a boxing game with swinging fists).

Figure 6:
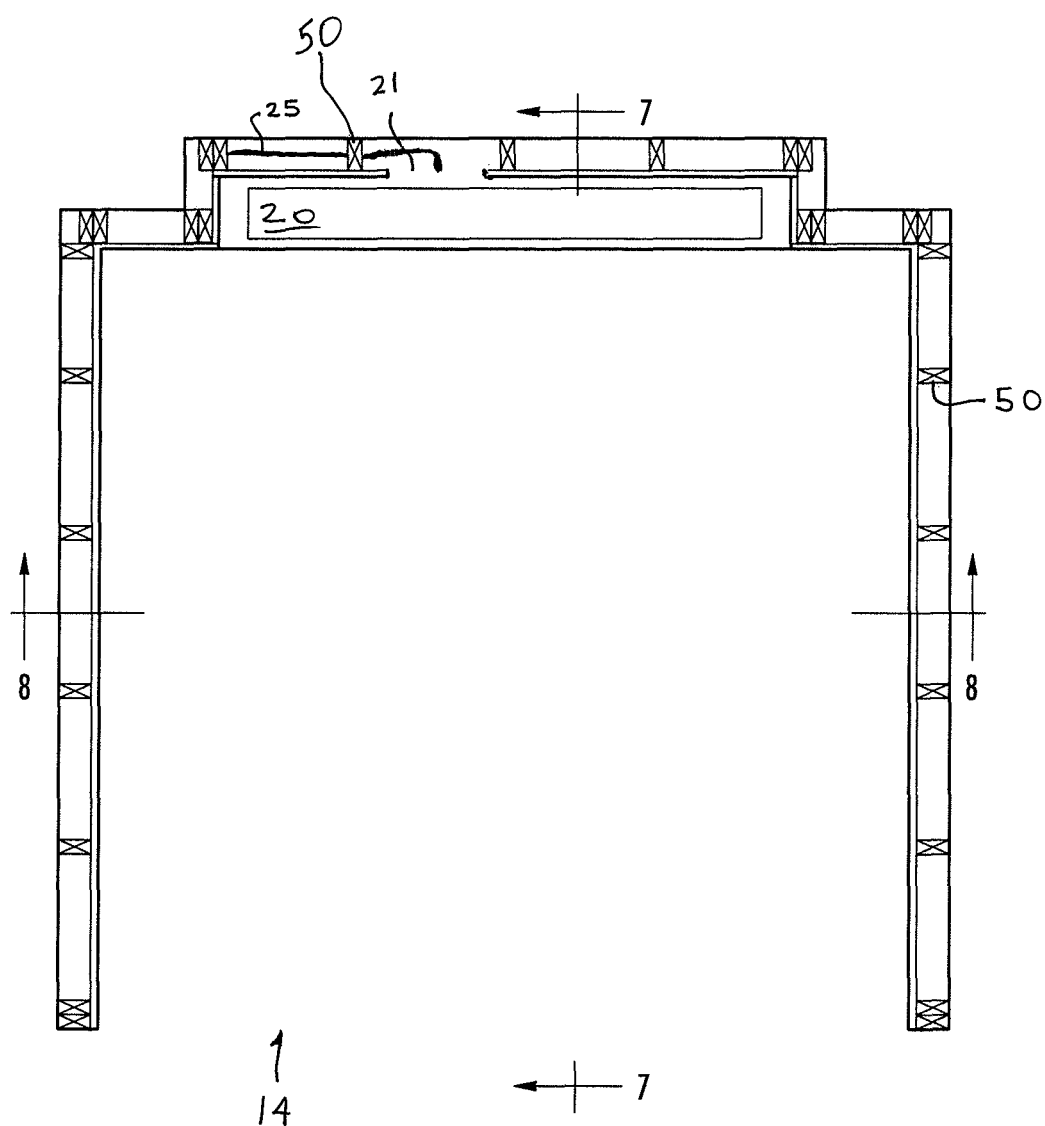
FIGS. 6-8 show different sections through the cell.
Figure 7:
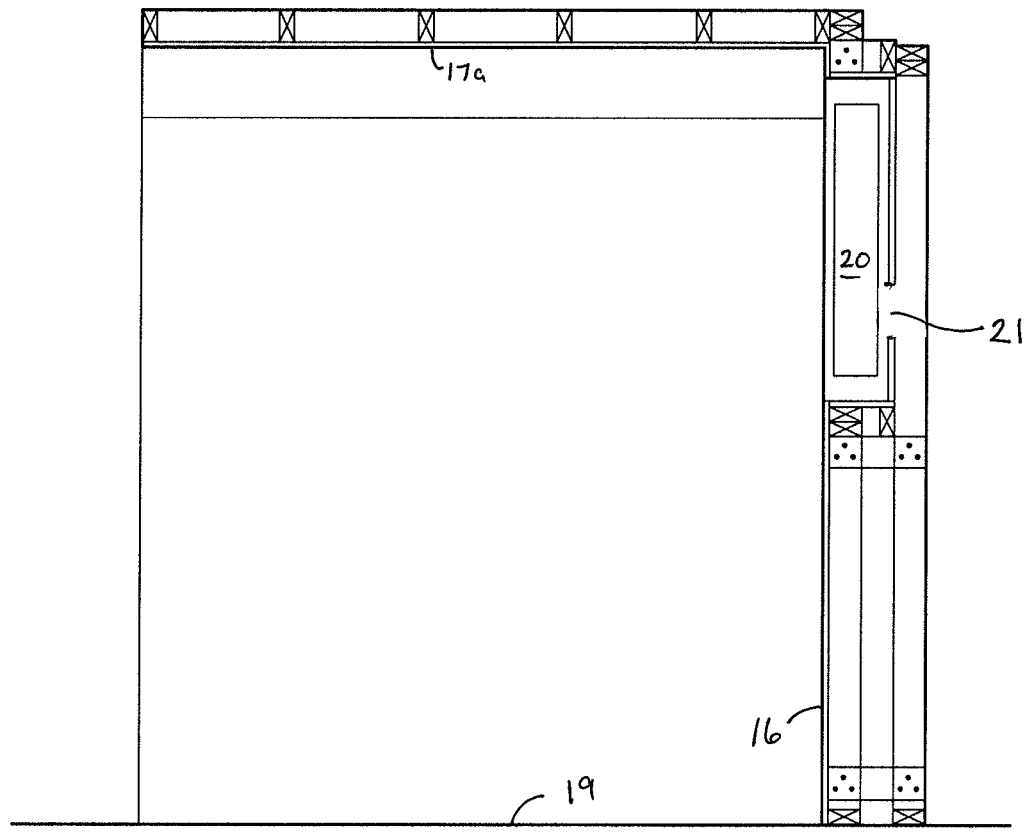
Figure 8:
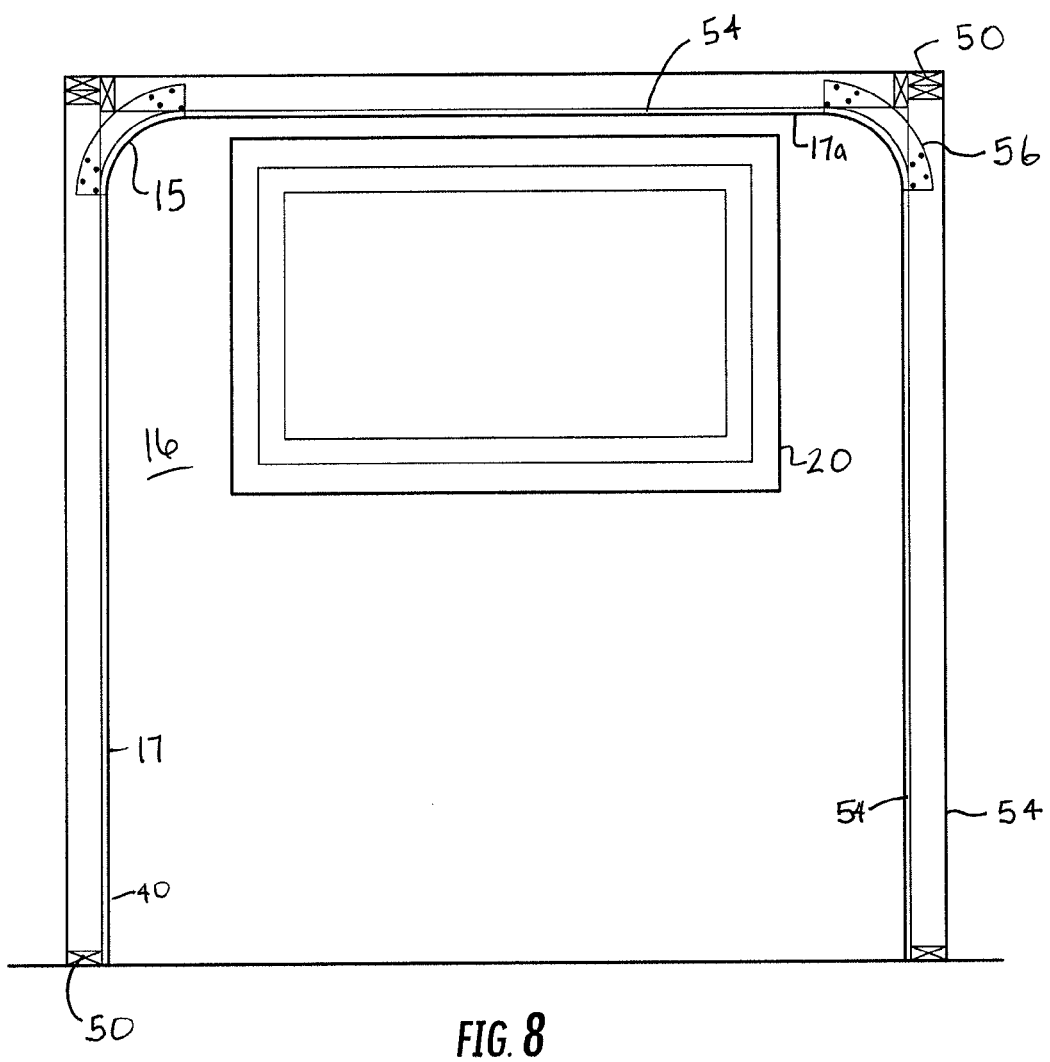

FIGS. 6-8 show cross sections through the cell 12 for one possible way of constructing the cell 12. In the embodiment shown in the figures, each cell 12 is bounded by 4 constructed walls 16, 17, 17a. A floor 19 serves as the base for the cell 12, and can also reflect the theme as shown (for the football theme, for example, the floor 19 could be a section of lined artificial turf. A fabricated floor can be included in the cell 12's construction and should be both durable cleanable. The cell 12 could also not include a prefabricated floor 19, and instead just use an existing floor or carpet.

FIGS. 6-8 show the common components with the earlier figures like the walls 16, 17, 17a, the open side 14, and the recessed cavity 20. These sectional views, however, also show that the cell 12 is constructed using standard construction framing techniques using studs 50 and wall board 54. Of particular note, FIG. 8 shows a radiused wall joint 15. The wall joint 15 is formed using the contour stud 56 with a radiused piece of wall board 58 secured thereto. As previously discussed, decorative paper 40 covers the wall board 54 to provide the cell 12's theme and provide a uniform and attractive surface within the cell 12.

Wall board 58 covers the outside faces of the cell 12 and may be covered with paint, wallpaper, or other material to present an attractive surface.

The recessed cavity 20 has a similar stud 50 and wall board 54 construction. As shown, the recessed cavity 20 may not provide room for the CPU 24 but the cavity 22 could provide a space for the CPU by merely being larger.

The CPU 24, screen 18, sensors 24a, speakers 26, controller 32, and monitor 70 are all connected to one another and power supplies either wirelessly (particularly the controller 32 has advantages for being wirelessly connected to the CPU 24) or using wires and cables (some cables 25 shown for illustrative purposes only). The cables could be run between the opposed wall boards through the studs 50 where necessary. Power to the lights 34 could similarly run between the opposed wall board.

While a stud 50 and wall board 54 constructions is shown in the figures, the cell's structural components could be preformed from plastic or other materials, especially if mass production of cells 12 is desirable. The cells 12 may be may be formed to have removably-interlocking or interchangeable parts for ease of construction and in order to allow an amusement center 10 owner to rearrange the game cells to suit their particular needs. The game cells 12 may be made so they can be easily constructed or taken down, rearranged, or stacked, depending on, for example, the space constraints of the amusement center 10.

It is appreciated that the game cells may be prefabricated for easy assembly, and may be formed to have interlocking or interchangeable parts for ease of construction and in order to allow a bar/restaurant owner to rearrange the game cells to suit their particular needs. The game cells may be easily constructed or taken down, rearranged, or stacked, depending on, for example, the space constraints of the bar/restaurant.

Note that the number of game cells is not limited, and that any interactive or multi-layer video games may be used. In some cases, a particular set-up may be used, such as in a tournament situation. For example, all game cells could be decorated having a unitary or related theme, and could all be running the same game, if the bar/restaurant were to have a tournament for a single video game.

Amusement Center Use

Figure 2:
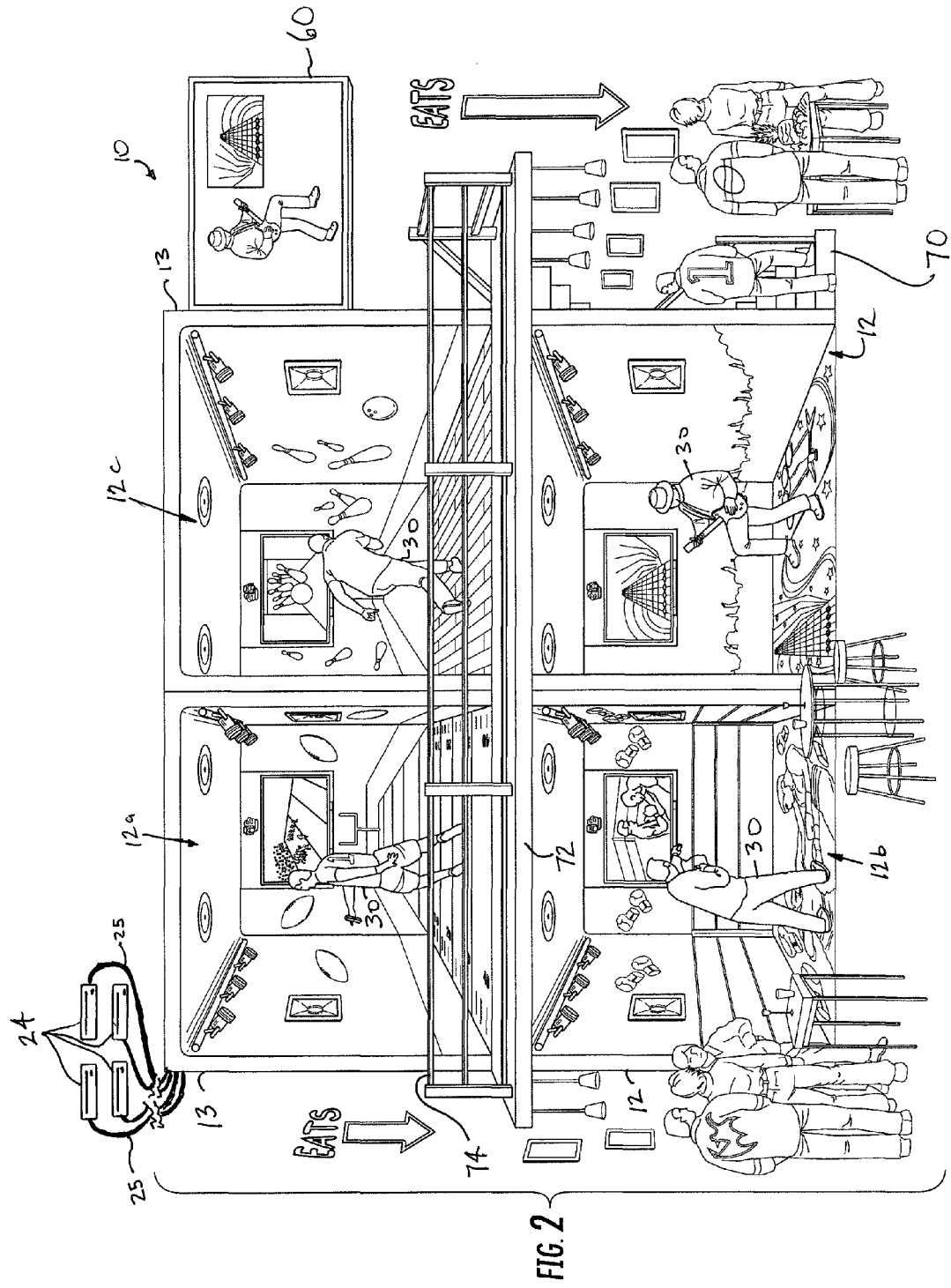
FIG. 2 shows a view of multiple cells in use inside a restaurant.

FIG. 2 shows multiple cells 12 in use in an amusement center 10, such as a restaurant, bar, arcade or similar recreational gathering place. FIG. 2 shows a stacked group of four cells 12, 13, although it should be clear that other numbers and arrangements of cell-groupings are possible. As shown, a person 30 accesses the upper cells 13 using stairs 71 and platform 72, which has a railing 74 attached thereto for safety. Other arrangements to access the upper cells 13 are possible and include without limitation elevators and other stairway variations.

Within the amusement center 10, people not in the actual games can follow gameplay on monitors 70. The monitors 70 can mimic the screen 18, show the camera 36's feed, combinations thereof, or multiple views from within multiple cells 12. The monitors 70 might also show reservations for cells 12 or tournament play results.

Tournament games that pit players against one another in games within single cells 12, cells 12 within the same amusement center 10, or even cells 12 in difference amusement centers 10. Additionally, the video systems in each cell 12 may be networked to each other directly, or via the internet. This would allow tournament play against different cells/centers, and spectators could watch video feeds could of the individual players in the various locations. Such tournament games could be "live" against opponents in the same game, like those tournaments and games available in the "Xbox Live™" and similar systems. A description of Xbox live at http://en.wikipedia.org/wiki/Xbox_Live and submitted in an enclosed Information Disclosure Statement is incorporated by reference as if fully set forth.

The cell 12's at least partially opened or openable configuration allows players 30 to move between the cell 12 and amusement center 10 to take mobile calls, talk with friends, order drinks, reserve additional time in the cell 12, and eat food. Moreover, having at least an open side 14 facing other amusement center patrons allows the other patrons of the amusement center 10 to participate as an audience to the players 30 playing the game. This adds to the amusement center 10's experience and also entices non-participating patrons to perhaps use one of the game cells 12. In this manner, patrons are encouraged to join in the game, and become a "star." This may invoke competition to drive other patrons to pay to participate in the game cells.

Amusement Center Management

As in the manner in which a bowling alley handles shoe rentals, for example, players 30 may come to a check-in/check-out booth or counter, and check-in/check-out controllers 32 and cell 12 rentals using cash, a credit card number, identification, etc. A cell 12 would generally be rented for a certain time period and could be used with the rented controller 32.

Figure 9:
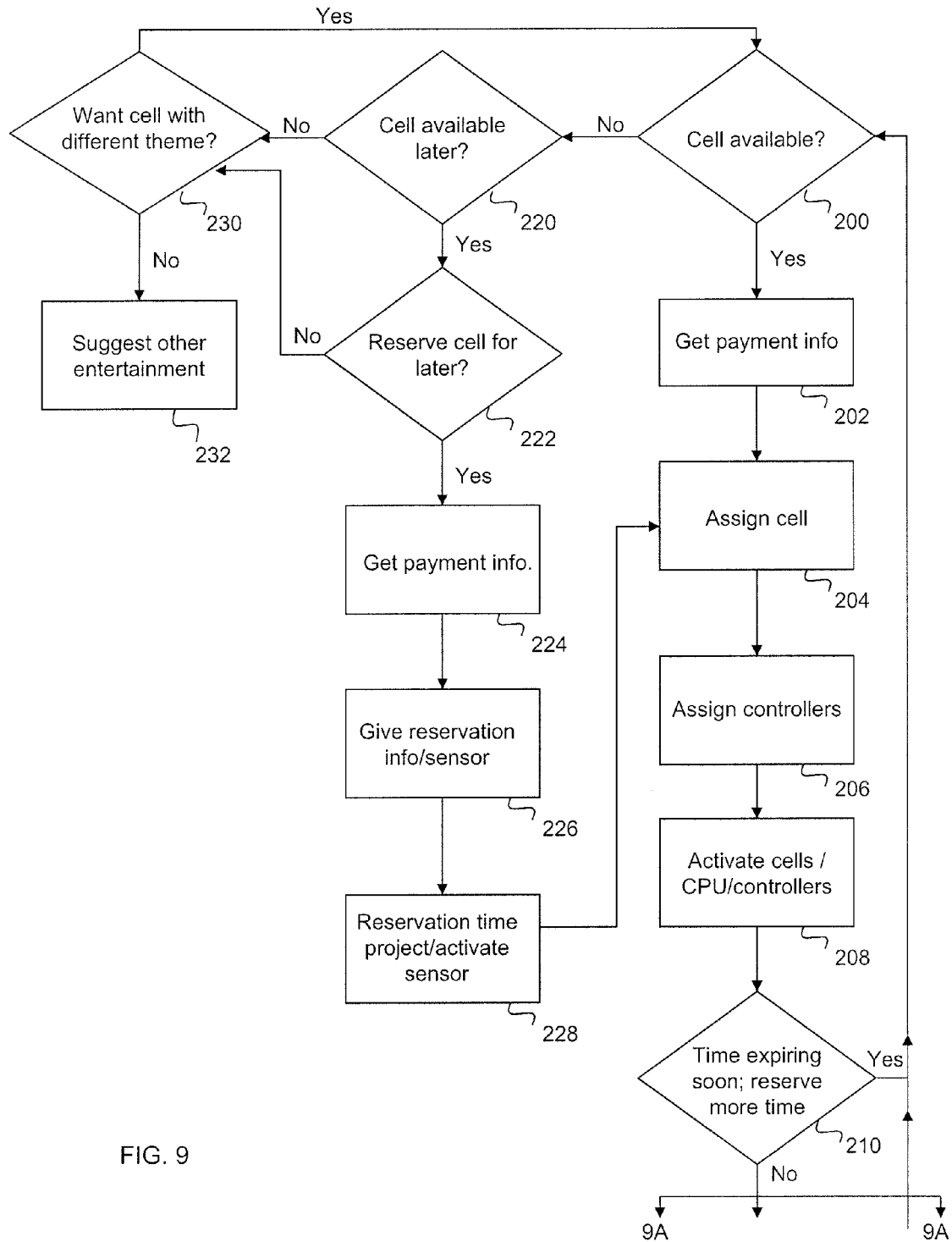
FIGS. 9 and 9*a* show steps in a method and system described herein.
Figure 9A:
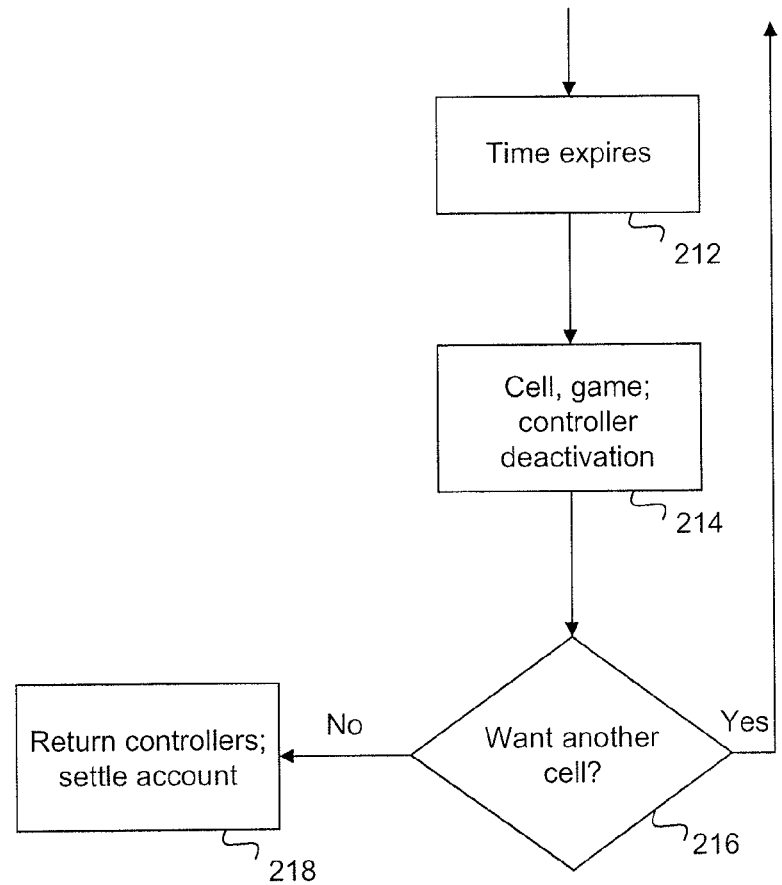

FIG. 9 shows a flowchart of a method and system for managing the cells and games within an amusement center 10. When a potential player 30 arrives at the checkout counter, the system first checks to see if the requested cell 12 is available, step 200. If the requested cell 12 is available, the player 30 gives payment information, step 202, usually in the form of a credit card so that food, drinks, and additional time could be ordered for the person (or their cell 12 and charged to this card.

Following payment processing, the system assigns a cell 12, step 204 and game controllers 32, step 206. The system then activates one or more of the cells 12, CPU 24, and/or controllers 32 or controller ports, step 208. Activation would entail ensuring that the cell 12, CPU 24, and/or controllers 32 or controller ports will work for the paid-for period of time. Such activation would entail some sort of automated circuit activation; similarly, deactivation would break the circuit so the cell 12, CPU 24, and/or controllers 32 could not be used. Deactivation could just entail cutting power to the lights 34 within the cell 12. The amusement center 10 would likely need some sort of security or enforcement to ensure that the cell 12 was only in use by authorized people.

As the prepaid time frame nears completion, the system would check with the player 30 to see if they would like to reserve more time, step 210. Such a check could be through the touchscreen ordering device or even the screen 18 within the cell 12. If the player 12 desired more time, the system reverts to step 200, although steps 202-208 may not need to be repeated.

If the player 30 does not want to continue playing, the time expires, step 212 and the cell 12/CPU 24/controller 32/controller port is deactivated, step 214. The player can then choose to rent another cell 12, step 216. If they do not want another cell 12, they can settle their account and return their controllers, step 218. If they want to rent another cell, they return to step 200, and may not need to repeat steps 202-208.

Each cell 12 may further include a port 34 to insert a memory device. The memory device would allow a player to save a particular game, or character to the device so that the user could restart the game at an appropriate starting point. Alternatively, the memory device for each cell may be stored centrally, wherein the central controller would store the game. This would also allow an amusement center to cell the user a particular memory device to the user after a session is terminated.

If the cell 12 is not available in step 200, the system checks to see if the cell 12 is available later, step 220. If the player 30 wants to reserve the cell 12 for later, step 222, the system gets payment information, step 224 (similar to step 202). Once the reservation is secure, the system could give the player 30 a reservation, step 226. The reservation could just be a time for the player to return to use the cell 12. It could also be a selectively activatable controller or other device that indicates when the cell 12 becomes available—such devices are well-known at major chain restaurants and light up/vibrate when a table is available. Other reservation notifications could include announcements over an address system or information on monitors 70. This permits the player 30 to enjoy the amusement center's other offerings (food, bar, dancing, etc.) while waiting for his reservation. Once the reservation time arrives, step 228, the player 30 returns to the cell 12 or checkout (in step 204) to start his game.

If a particular cell is not available or a player 30 does not want to reserve the cell for later due to personal conflict, the system asks if the player 30 would like a difference themed cell 12, step 230. If the player wants another cell 12, they are returned to step 200. If not, the system of operator at the checkout desk can suggest other forms of entertainment available in the amusement center, step 232.

The controllers 32 may be equipped with tracking devices such as RFID chips or other means, that may be monitored by the system. The RFID tags would prevent theft or accidental loss. A bracelet system could also be employed, where players 30 receive a bracelet before being permitted to use a game cell 12. The bracelets could have RFID chips or similar means for tracking or monitoring the player 30 and ensuring that they are the only player in their rented cell 12, i.e., they are not using a cell 12 that they did not rent. Further, a security system such as used in department stores may be employed, so that players cannot take the controllers 32 past a certain point without setting off an alarm.

Each game cell 12 could have food and beverage service directly to it. Accordingly, a game cell 12 may include a service table, chairs, and benches. Moreover, a waitstaff person (who could be dressed corresponding to the theme in the cell 12, e.g., a cheerleader, spacesuit, baseball umpire) may be assigned to a specific game cell or group of game cells, so that the players can receive personalized VIP treatment in addition to game immersion.

Figure 10:
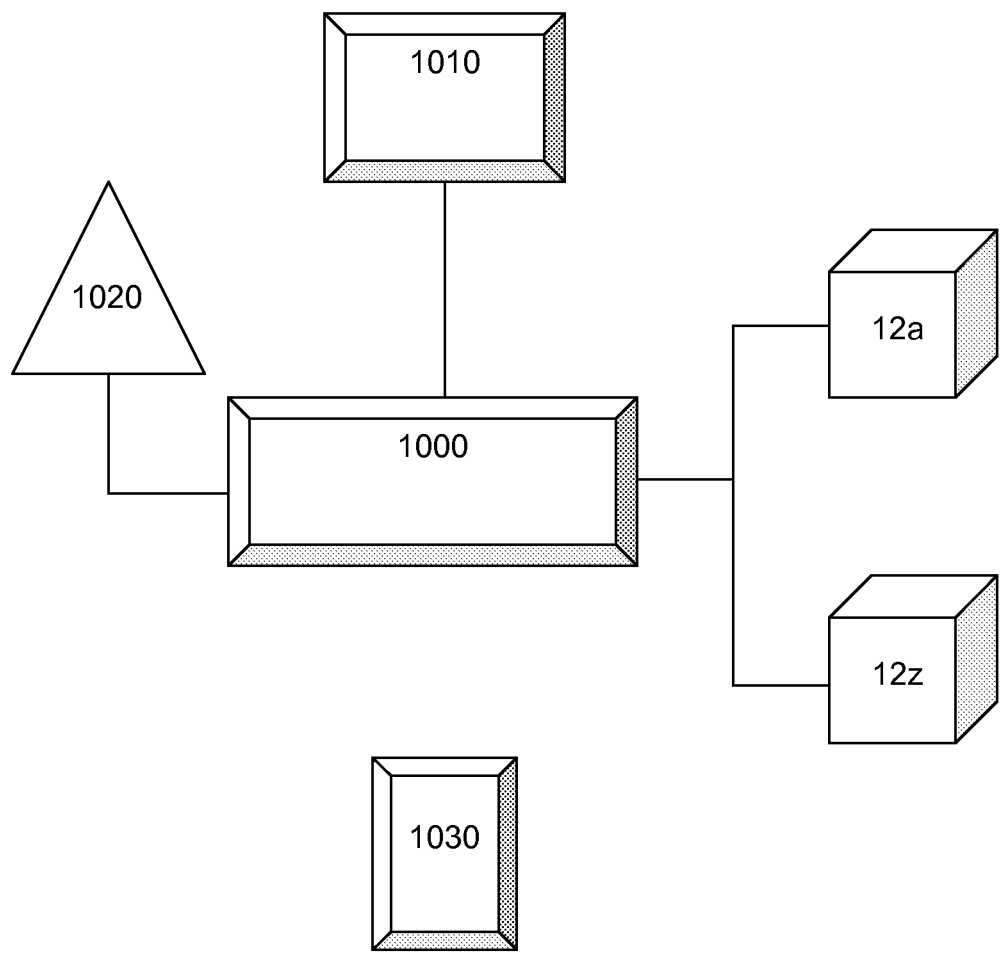
FIG. 10 is a block diagram for the control system for an amusement center as described herein.

FIG. 10 is a block diagram for the control system for an amusement center. As shown in the figure, a plurality of cells 12a-12z are connected to a centralized control unit 1000. The control unit 1000 operates as a brain center for the system. It receives all of the video/audio/data feeds from cable broadcast, satellite broadcast, gaming systems and performs the switching and control functions between the various feeds. The control unit 1000 also controls access to each of the cells 12a-12z. A user interface 1010 is connected to the control unit 1000. The user interface 1010 allows a user to select options, perform switching functions and perform control tasks. The control unit 1000 also has a receiver 1020 to receive controls from a wireless remote device 1030. The wireless remote device 1030 is configured with an interface that is similar to the user interface 1020, and allows an operator to control each cell 12a-12z remotely.

The disclosed game cells, amusement center, and system immerse a player in an experience, and allows video game skills honed in the privacy of a person's home to be displayed to a crowd (such as within a larger establishment such as a bar or restaurant) and the offered video games may be varied to cater to a wide audience. The game cell 12 may be rearranged to suit the needs of the bar/restaurant where it is employed. Moreover, while generally described in an amusement center 10, such a cell 12 could be set up in a home or other space as well. A truck or other conveyance could contain mobile game cells that could be set up in the parking lot of, for example, a stadium or other location, or on a city street, creating a mobile game cell environment. Cells can be easily fabricated for assembly and disassembly.

Having thus described in detail several embodiments, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of the claims are therefore to be embraced therein.

What is claimed is:

1. A method of providing entertainment, implemented by a control unit associated with a game cell bounded by walls, the game cell including a receiver, comprising:
   receiving, by the receiver operatively coupled to the game cell, a signal from the control unit, the signal including images generated by a first video game console system;
   displaying, by a screen operatively coupled to the receiver, the images generated by the first video game console on a screen inside the game cell; wherein an inside face of at least one wall of the game cell is decorated with a theme that corresponds to a game playable on the first video game console system;
   generating a request signal of a player, by a processor operatively coupled to the game cell through a user interface;
   transmitting the request signal to the control unit, wherein the control unit is configured to check for the availability of the cell for use by the player;
   receiving, by the processor, a confirmation signal from the control unit confirming availability of the cell; and
   accepting by the processor, electronic payment from the player for rental of the cell for a period of time.

2. The method of claim 1, further comprising the steps of:
   in response to the payment, the processor transmitting a signal activating at least one of the controller, cell, or video game console for the period of time associated with the rental; and
   transmitting a signal, by the processor, deactivating at least one of the controller, cell, or video game console at an end of the period of time associated with the rental.

3. The method of claim 1, further comprising the steps of:
recording, by a camera operatively coupled to the control unit, activity in the cell; and
storing the activity on distributable media.

4. The method of claim 1, wherein the game cell further comprises at least one ambient feature related to the game being played.

5. The method of claim 4, wherein the at least one ambient feature is selected from the group consisting of: graphics, décor, theme motif, sound, odor, and ornamentation.

6. The method of claim 1, further comprising controlling the game cell wirelessly using a wireless remote device.

7. The method of claim 1 further comprising connecting the video game console system to another video game console system directly or via the internet.

8. The method of claim 1, further comprising the game cell interacting, via at least one controller with the first video game console system.

\* \* \* \* \*